(12) United States Patent
Armstrong et al.

(10) Patent No.: US 9,069,580 B2
(45) Date of Patent: Jun. 30, 2015

(54) APPLICATION DOCUMENTATION EFFECTIVENESS MONITORING AND FEEDBACK

(75) Inventors: Andrew A. Armstrong, Chandlers Ford (GB); Richard W. Pilot, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 325 days.

(21) Appl. No.: 13/159,008

(22) Filed: Jun. 13, 2011

(65) Prior Publication Data

US 2012/0317481 A1   Dec. 13, 2012

(51) Int. Cl.
*G06F 3/048* (2013.01)
*G06F 9/44* (2006.01)

(52) U.S. Cl.
CPC .................................... *G06F 9/4446* (2013.01)

(58) Field of Classification Search
None
See application file for complete search history.

(56) References Cited

U.S. PATENT DOCUMENTS

| 7,024,658 | B1 | 4/2006 | Cohen et al. | |
| 7,152,054 | B2 | 12/2006 | Gordon et al. | |
| 7,543,232 | B2 | 6/2009 | Easton, Jr. et al. | |
| 7,636,887 | B1 | 12/2009 | Kinnucan, Jr. | |
| 7,849,405 | B1 | 12/2010 | Coletta et al. | |
| 7,882,090 | B2 | 2/2011 | Richardson et al. | |
| 8,024,660 | B1 * | 9/2011 | Quinn et al. | 715/745 |
| 8,239,526 | B2 * | 8/2012 | Simpson et al. | 709/224 |
| 2003/0016238 | A1 * | 1/2003 | Sullivan et al. | 345/705 |
| 2007/0157093 | A1 * | 7/2007 | Karcher | 715/707 |
| 2010/0076998 | A1 * | 3/2010 | Podgorny et al. | 707/772 |
| 2011/0131491 | A1 * | 6/2011 | Lu et al. | 715/708 |

* cited by examiner

*Primary Examiner* — Matt Kim
*Assistant Examiner* — Hua Lu
(74) *Attorney, Agent, or Firm* — Lee Law, PLLC; Christopher B. Lee

(57) ABSTRACT

A user access to help content of an application executed by a computing device is detected. The help content includes at least one configured projected user interaction with the application. At least one subsequent detected user interaction with the application is recorded. A key pair that correlates the accessed help content with the at least one subsequent detected user interaction with the application is created. Effectiveness of the help content is determined based upon the key pair and the at least one configured projected user interaction with the application.

24 Claims, 5 Drawing Sheets

APPLICATION DOCUMENTATION EFFECTIVENESS MONITORING AND FEEDBACK

BACKGROUND

The present invention relates to help systems and documentation for application programs. More particularly, the present invention relates to application documentation effectiveness monitoring and feedback.

Application programs often include application documentation that provides instructions to assist users with learning how to use the application. Help documentation may be stored with the application or stored in association with information centers accessible to users of the application. The application documentation may be topic based and may include tutorials. Help systems associated with the application programs allow users to browse documentation for the application program to identify application documentation for a topic of interest. Some help systems allow users to search the application documentation to identify application documentation for a topic of interest.

BRIEF SUMMARY

A method includes detecting a user access to help content of an application executed by a computing device, where the help content comprises at least one configured projected user interaction with the application; recording at least one subsequent detected user interaction with the application; creating a key pair that correlates the accessed help content with the at least one subsequent detected user interaction with the application; and determining effectiveness of the help content based upon the key pair and the at least one configured projected user interaction with the application.

A system includes a memory and a processor programmed to detect a user access to help content of an application executed by the processor, where the help content comprises at least one configured projected user interaction with the application; record at least one subsequent detected user interaction with the application to the memory; create a key pair that correlates the accessed help content with the at least one subsequent detected user interaction with the application; and determine effectiveness of the help content based upon the key pair and the at least one configured projected user interaction with the application.

A computer program product comprising a computer readable storage medium including computer readable program code, where the computer readable program code when executed on a computer causes the computer to detect a user access to help content of an application executed by a computing device, where the help content comprises at least one configured projected user interaction with the application; record at least one subsequent detected user interaction with the application; create a key pair that correlates the accessed help content with the at least one subsequent detected user interaction with the application; and determine effectiveness of the help content based upon the key pair and the at least one configured projected user interaction with the application.

DETAILED DESCRIPTION

Figure 1:
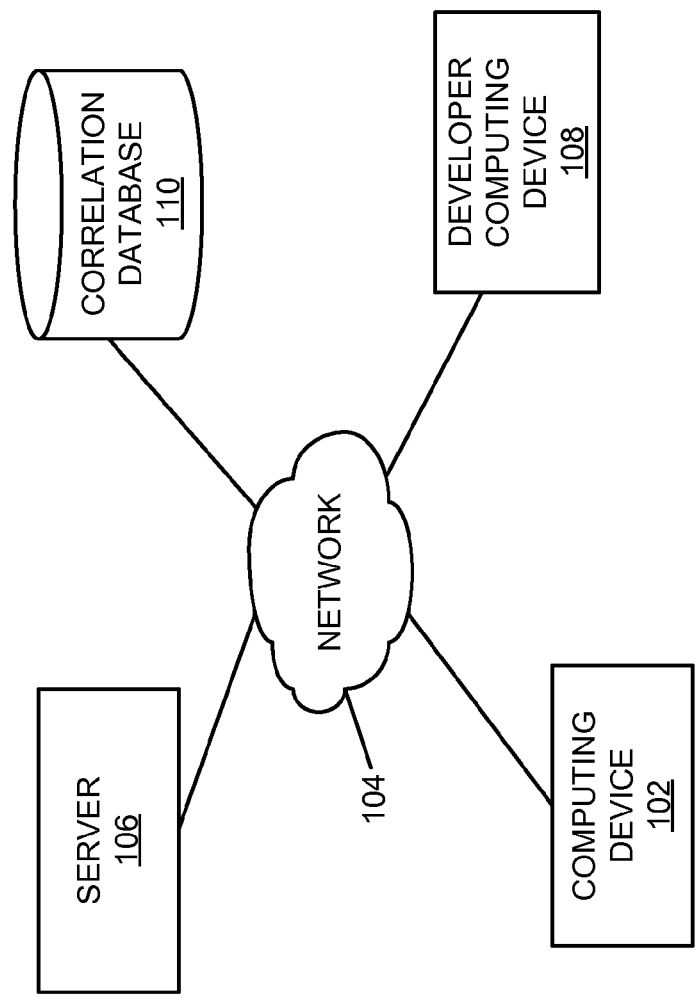
FIG. 1 is a block diagram of an example of an implementation of a system for automated application documentation effectiveness monitoring and feedback according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated application documentation effectiveness monitoring and feedback. Application documentation, such as help pages/articles and help topics, tutorials, and other forms of instruction assist users with learning to use and become proficient with an application, such as a software application or an interactive computer system. Application documentation, such as help pages/articles and help topics, tutorials, and other forms of instruction for applications will be referred to herein collectively for brevity as "documentation" or "help content." Help content may be integrated into an application or accessed via a web server (e.g., information center) or other approach.

By use of the automated application documentation effectiveness monitoring and feedback described herein, help content is augmented (e.g., tagged) by a documentation developer with one or more expected, projected, and/or target outcomes that may include tracking metrics, such as a number of subsequent user interactions or selections (e.g., mouse clicks, menu selections, etc.) used to perform a task within the application that is associated with the help content. As such, an expected outcome may be considered a predicted or target solution for the particular item of help content, which may be initially configured and changed over time as an application and help content evolves through monitored feedback as described herein.

A user access to the help content is detected, either within the application system or via access to an external web page or information center. An area of processing within the application may also be determined and the accessed help content may be identified. The accessed help content includes at least one configured projected subsequent user interaction or expected outcome. At least one actual user interaction with the application is identified and recorded in response to detecting the user interaction with the help content. A key pair is created that includes an identifier of the visited help content and the subsequent user interaction(s) with the application.

As such, the key pair correlates the visited help content with the subsequent actual user interaction(s) to determine how a user's approach to use of the application was similar or different relative to the expected, predicted, and/or target solution for the article of help content. The key pair may be used to determine whether the expected outcome associated with an item of help content was achieved, and may further be used to determine whether the expected outcome was achieved by the configured target solution or whether a different approach was used by the user.

The effectiveness of the help content is determined based upon the key pair and the configured projected subsequent user interaction with the application. As such, the present subject matter allows a system to determine how its help content is being used as well allowing the system to determine whether this usage was intended by the documentation writers. Feedback is provided to the application documentation developers in the form of a determination of the effectiveness of the respective help content. Further, suggestions for improvement of the documentation may be provided.

An application developer or documentation writer may utilize the feedback to understand what a particular user or set of users was trying to accomplish with the application relative to what the user(s) actually did with the application. The application developer or documentation writer may then modify and refine the particular help content to improve clarity and guidance, to improve usability and learning of the documentation, and to improve the intended meaning and effectiveness of the documentation. As such, the present subject matter allows application developers and documentation writers to identify areas where users need more refined help, thereby allowing improved usability within an application and a reduction of the occurrence of user-caused errors.

This improved clarity, guidance, and effectiveness may be performed during development and after a product is already in use. Accordingly, the present subject matter allows for a continual cycle of feedback that scales well to different system complexities and that is transparent to users. User transparency may help to ensure accuracy of concluded results. Unlike focus groups and usability studies, as use of an application grows, the cost of gaining useful conclusions regarding help content may remain relatively constant while improving documentation and reducing service level costs, as well as producing more reliable results over a larger subset of users and over time.

As described above, the automated application documentation effectiveness monitoring and feedback may be partitioned into two phases. The first phase includes tagging existing documentation and help content with specific expected outcomes. The second phase includes automated analysis of user accesses to documentation and recording of the subsequent user interaction with the application after a user access to help content is detected.

Detection of access to help content may include a variety of triggering events. For example, detection of a user access to a help system, a help menu, or a help search may trigger recording of subsequent user interactions with the application. Additionally, where a particular field in a graphical user interface includes a question mark icon (e.g., "?") that when hovered over with a mouse produces a popup dialog that states what a particular field is used for, detection of a user hovering a mouse over the question mark may trigger monitoring and recording of subsequent user interactions with the application. As such, detection of help access may be implied or inferred from a variety of application user interactions. Many other variations of triggers for invoking automated recording of user interactions in association with a detected access to help content are possible and all are considered within the scope of the present subject matter. The subsequent user interactions are recorded as the key pair that associates the user interactions with the accessed help content and the specific expected outcome(s). The key pair provides feedback for automated analysis of application user interaction as described in more detail below.

A configurable key-pair recording timeout or recording period may be utilized to allow capture of subsequent user interactions for a configurable amount of time. The configurable key-pair recording timeout or recording period may be set for each item of help content to provide granularity, or may be set for entire help topics or for the entire application, as appropriate for a given implementation. Additionally or alternatively, a number of user interactions subsequent to help content access may be recorded. In such an implementation, where the configured number of user interactions occurs prior to expiration of the recording period, the recording may stop and the key pair may be created with the number of user interactions that match the configured number of user interactions. Alternatively, where the recording period expires prior to the detection of the configured number of user interactions, the recording may stop and the key pair may be created with the number of interactions during the recording period.

The defined intended or expected outcome for help content represents a correlation between the respective item of help content and a measure of proficient use of the application. The measure of proficient use may include, for example, a number of user interactions or selections used to efficiently perform a task within the application associated with the help content. As such, the defined intended outcome may be considered an effectiveness goal or effectiveness target for user interaction with the application responsive to the user viewing the help content. The defined intended outcome may further be considered a correlation between the respective item of help content and an anticipated or projected user objective for accessing the help content, such as learning how to use the application to perform the respective task described within the item of help content.

The defined intended or expected outcome for an item of help content may, for example, include a measure of how many times a user has to visit a help subsystem and access help content for the user to achieve the user's objective. Alternatively or additionally, the defined intended outcome for an item of help content may include a measure of how many application user interactions (e.g., mouse clicks, menu selections, etc.) a user makes in response to viewing help content for a particular aspect of use of the application prior to achieving the user's objective of learning to perform the respective task with the application associated with the help content. Many other variations of a defined intended outcome are possible and all are considered within the scope of the present subject matter.

Additionally, multiple possible and alternative expected outcomes may be configured for a given item of help content as appropriate for a given implementation. For example, a particular task within an application may have multiple access or interaction options, such as use of a drop down menu to activate a feature, use of an icon to activate the feature, use of a keyboard shortcut to activate a feature, or other options. As such, one or more of the available options for accessing the feature or performing the task may be configured as an expected outcome. Detection of a user interaction via any of the configured expected outcomes may be considered as an effective outcome for the item of help content. Use of a different approach or lack of completion of the task associated with the particular item of help content may or may not be considered an ineffective outcome.

For example, a different approach to a task may be determined to result in a new and alternative approach to program use via the feedback analysis described herein. Alternatively, where an item of help content is accessed, but the expected goal is not detected subsequent to the access within a configured monitoring period, the feedback analysis may deduce that the item of help content was ineffective or that the item of help content was misleading. However, if access to a different item of help content is detected and the expected outcome is detected for that topic, weighting of the deduction of the previously-accessed item of help content as being ineffective may be reduced. Many alternatives for feedback analysis of user interactions are possible and all are considered within the scope of the present subject matter.

Further, where multiple expected outcomes are configured, a counter may be added to key pairs and/or maintained for each of the multiple options selected across different users. Based upon the statistical results of option selection by users, the actual help content itself may be rearranged or changed. As such, the automated application documentation effectiveness monitoring and feedback includes a self modifying help content feature that provides for analysis of such usage trends and for reorganization of and/or creation of help content in response to such trends. For example, where a help content developer provided two help options for a topic such as printing (e.g., file menu->print or selecting a print icon), analysis of the created key pair may be performed to increment a counter at the time of analysis for each option selected. Thresholds for automated modification of help content may be configured such that help content may be modified when a given percentage of users select a given option. Within the example above, if a predominant number of users select the print icon option, the two help options may be automatically rearranged within the help content itself (e.g., selecting a print icon or file menu->print). Accordingly, automated incremental improvement of help content may be performed with direct correlation to preferred user interactions with an application to provide a dynamic help content environment that reduces user learning time and that enhances user experiences while learning and using an application.

The recording of the subsequent actual user interaction may occur, for example, in response to detecting an operating system focus returning to the application (e.g., detection of an exit from the help system, or focus returning to an application content pane or dialog box). It should be noted that in certain implementations, help content may be concurrently displayed while a user navigates within an application, such as when the help content includes an interactive or non-interactive tutorial or is displayed within a pane of the application. In such an implementation, for purposes of the present description, focus may be considered to return to the application in response to detection of a user interaction with the application without exiting from a help system.

Once the key pair has been recorded, a comparison of the key pair (e.g., the help content and user interactions) against the expected outcome is made. This processing may be performed relative to multiple installations of an application or interactive system. A database of results from the various installations may then be collated and processed to provide enhanced feedback including statistical measures and other data regarding documentation effectiveness across multiple users.

Additionally, the processing described herein may determine that the resulting actual user interaction does not correspond to the expected action and may identify alternative help content that matches the actual resulting user interaction. If the user accesses the application documentation within a configurable amount of time (e.g., a few seconds), then the identified help content may be recommended to the user based upon a determined likelihood that the identified help content corresponds to an outcome that the user was actually trying to achieve.

Help content revisiting by a user may also be detected and analyzed. For example, where a user accesses help content, interacts with an application, then revisits the same help content again, this repeated interaction with help content may also be captured within the key pair. As such, information may be correlated across multiple help content accesses and feedback of the repeated help accesses may be provided.

Further, a user revisiting a particular item of help content may also be configured as an expected outcome. Revisiting an item of help content may provide additional information for refinement of the help content. For example, where a particular task associated with use of an application is complex and may be challenging for users, an expected outcome may be configured to vary over time (e.g., number of user interactions may be configured to decrease over time). As such, an expected outcome may be configured with the goal of less time being required for the user to achieve the target outcome for each successive access to the section or item of help content. Additionally, a level of difficulty associated with the particular item of help content may be interpreted based upon a number of accesses by a particular user or group of users to a section or item of help content. Many variations on monitoring and analysis of revisited help content are possible and all are considered within the scope of the present subject matter.

Further, for purposes of analysis, revisiting a help topic may also be monitored, for example, to create a key pair even where any configured recording period has not elapsed and/or a configured number of user interactions other than returning to the help content have not occurred. Such a key pair may still provide useful information for analysis of application use and complexity, and correlation with other use trends. Further, a new monitoring sequence may begin in response to focus again returning to the application from the help content and a new key pair may be created as described above and in more detail below.

Additionally, inferential help content lookup may be performed to further assist users with tasks they are trying to accomplish within an application. Inferential help content lookup may be performed, for example, to identify alternative help content related to actual user interaction with the application by real-time analysis of subsequent user actions or key pairs created during a given user interaction with an application. Additionally, inferential help content lookup may be performed, for example, by real-time analysis of subsequent user actions or key pairs created during application interaction by other previous users by accessing correlation information for key pairs within a database or repository of key pairs and correlation information. Analysis of key pairs that have been created may be used to automatically deduce a user's goal regarding use of an application and may be used to suggest or recommend additional and/or alternative help content. Many variations on inferential lookup are also possible and all are considered within the scope of the present subject matter.

To facilitate detection of help content access, several options are available. For example, an application level event may be triggered when a user selects a help feature within an application. Additionally or alternatively, help-monitoring specific hyperlinks may be embedded into online documentation using a custom protocol registration or a browser plugin. Where, for example, a user selects an option to open a webpage associated with an information center, the browser may notify the application's help monitoring component via these links. The creation of a custom protocol may be implemented via the application adding an entry in the application registry when installing the application or via an application update. This registry entry would inform the browser which application is registered with the relevant help tracking protocol. The help monitoring component may then either be embedded in the application or may be made available as a standalone utility to be included separately from the application.

For example, the following pseudo hyperlink represents an example format for creation of a help-monitoring specific hyperlink:
company://notify/openHelp/<Product>/<helpArticleID>

A help-monitoring specific hyperlink of a form such as the pseudo hyperlink above may be utilized to inform an executable of an application named <Product> that a help article has been opened. The help content identifier may be identified and/or passed via the <helpArticleID> to provide a capability for correlation of the help content with the subsequent user application interactions via the created key pair.

Similar help-monitoring specific hyperlinks may be utilized for identification of other events. For example, events such as detection of a user leaving/exiting an item of help content or a help content search may be processed similarly to provide additional event tracking associated with the automated application documentation effectiveness monitoring and feedback described herein.

Where, for example, help content is viewed in an external browser, processing may wait until focus is regained within the application and then continue to record the subsequent user interactions. As such, processing of the form to wait for help content to be accessed may be one event that is triggered (e.g., either via the system/application or externally, triggered by custom hyperlink, or triggered via a plugin). In response to such a triggering event, the processing may record the next configured number of steps (e.g., user interactions) the user takes within the system/application. The number of user interactions may be determined by either a timeout or maximum number of steps variable that may be set to the configured number of user interactions. The results (e.g., a key pair) may be created and uploaded to a central database. Where the monitoring processing determines that the same help page is accessed again, it may identify other help content that has the same or similar expected outcomes and provide those help content selections as alternative recommendations to the user.

Data across multiple user interactions may be correlated to provide information, such as a number of users that experienced usability issues with a particular task. Analysis of the results/key pairs may be performed by the module that performs the monitoring or a different module as appropriate for a given implementation. The analysis phase of processing involves analyzing the collected data and generating a help content feedback report that may be provided to a development team. Automated processing may highlight actions taken most often by a group of users as primary areas where help with an application is often requested. Frequency of help content access across users may be interpreted as a usability issue to the development team. A high frequency of views/accesses for a particular item of help content may imply a difficult task within the application that may be improved and made more intuitive. The output of the automated analysis may be generated in the form of a usability notification/report, such as via an email message or instant message, or a message generated via any other messaging framework, that outlines the help content and appropriate application components. This usability notification/report may highlight areas to be assessed for possible usability and clarity improvements with the application. The automated analysis may further determine a configurable number of top usability issues (e.g., the top "N" issues) identified with the application, ranked by the frequency of help content occurrences. This ranked set of usability issues may help prioritize and focus usability team effort for application enhancement. Alternatively, developers and help content maintainers may access this database directly and determine whether the resulting action taken by application users is appropriate for the help content viewed. Changes may be made to this help content and included in future releases of the application, as appropriate for a given implementation.

Several issues may be considered in association with analyzing help content. Further, a number of different or alternative actions may result from a user following usability advice presented via help content. For example, help content associated with printing a document may have several print options presented, such as selecting a "Print" option from a "File" menu, selecting a "Print" icon from a menu pane, and other alternatives. Where multiple possible actions such as these may be associated with a particular item of help content, each such action may be provided with its own entry tagged against the help content so that the monitoring system does not flag any particular alternative action as requiring updating if the user follows one of the viable alternatives. Also, the monitoring system may be configured to identify how help content is related to user actions to allow user interface designers to modify the user interface by providing help tips within the user interface itself so that the user does not have to initiate a search for help. Many other possibilities exist for automated application documentation effectiveness monitoring and feedback and all are considered within the scope of the present subject matter.

Filtering of key pairs may be performed to focus analysis on a particular type of interaction. Filtering may be inclusive or exclusive in nature. For example, an inclusive filter may be implemented to focus analysis on key pairs where a recording period is exceeded by users for a configured proportion of key pairs for a given help topic. Additionally, an exclusive filter may be implemented to exclude key pairs where a recording period was not exceeded for a configured proportion of key pairs for a given help topic. Such filtering may be utilized to guide the automated feedback provided, such as identification of the top usability issues, as described above.

It should be noted that conception of the present subject matter resulted from recognition of certain limitations associated with developer feedback for existing application documentation and help systems, which prompt users for feedback and that provide skewed results where users elect not to respond to feedback inquiries. For example, the present subject matter improves application documentation and helps systems by providing automated determination of the effectiveness of application documentation by correlating that effectiveness with attainment of user goals in using the application documentation, as described above and in more detail below. As such, improved application documentation and help systems may be obtained through the automated application documentation effectiveness monitoring and feedback described herein.

The automated application documentation effectiveness monitoring and feedback described herein may be performed in real time to allow prompt monitoring and feedback of application documentation effectiveness. For purposes of the present description, real time shall include any time frame of sufficiently short duration as to provide reasonable response time for information processing acceptable to a user of the subject matter described. Additionally, the term "real time" shall include what is commonly termed "near real time"— generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated application documentation effectiveness monitoring and feedback. A computing device 102 communicates via a network 104 with a server 106. Both the computing device 102 and the server 106 may store and access content within a correlation database 110.

As will be described in more detail below in association with FIG. 2 through FIG. 5, the computing device 102 and/or the server 106 provide automated application documentation effectiveness monitoring and feedback. The automated application documentation effectiveness monitoring and feedback is based upon tracking of user accesses to help content associated with an application executing at least in part at the computing device 102. It is understood that an application may be distributed and/or executed in part by a server device, such as the server 106 or other server, without departure from the scope of the present subject matter. The help content may be stored either locally in association with an application on the computing device 102 or in association with the server 106. If the help content is stored in association with the server 106, the computing device 102 may detect a user request for help content and cause the computing device 102 to access the help content via the server 106.

It should be noted that the computing device 102 may be a portable computing device, either by a user's ability to move the computing device 102 to different locations, or by the computing device 102's association with a portable platform, such as a plane, train, automobile, or other moving vehicle. It should also be noted that the computing device 102 may be any computing device capable of processing information as described above and in more detail below. For example, the computing device 102 may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server 106 may include any device capable of providing applications and/or help content for consumption by a device, such as the computing device 102, via a network, such as the network 104. As such, the server 106 may include a web server, an application server, a development/deployment server, or other data server device as appropriate for a given implementation.

Further, the server 106 may be accessed by a developer computing device 108 for uploading applications and help content for distribution by and/or access via the server 106. A developer may use the developer computing device 108 to develop applications and help content, and store the developed applications and help content to the server 106. Additionally, the developer may utilize application documentation effectiveness output/feedback from either the computing device 102 or the server 106. This application documentation effectiveness output/feedback may trigger automated modification to the help content, as described above and in more detail below. Alternatively, the developer may review the automatically generated feedback and suggestions that may be ranked based upon an automated priority ranking and may determine which suggested help content or application improvements may be implemented.

A correlation database 110 may be accessed by each of the respective devices of FIG. 1. The correlation database 110 may be used for storage and retrieval of key pairs, analysis and correlation data across key pairs, storage and distribution of application effectiveness feedback results, or other information useable for the automated application documentation effectiveness monitoring and feedback, as appropriate for a given implementation.

Figure 2:
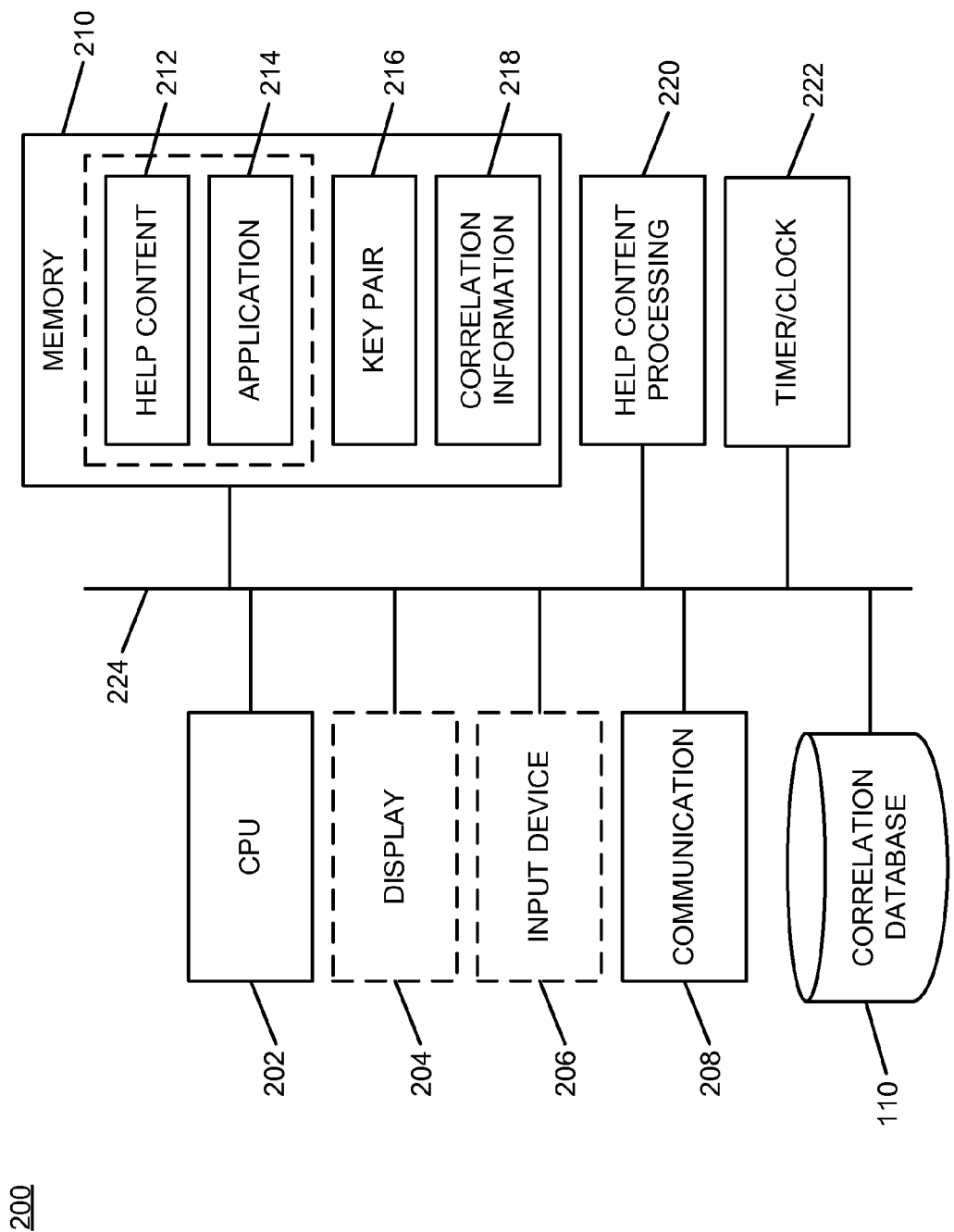
FIG. 2 is a block diagram of an example of an implementation of a core processing module capable of performing automated application documentation effectiveness monitoring and feedback according to an embodiment of the present subject matter.

FIG. 2 is a block diagram of an example of an implementation of a core processing module 200 capable of performing automated application documentation effectiveness monitoring and feedback. The core processing module 200 may be associated with the computing device 102, the server 106, and/or the developer computing device 108 as appropriate for a given implementation. Further, the core processing module 200 may provide different and complementary processing of application documentation effectiveness in association with each implementation, as described in more detail below.

For example, the core processing module 200 may be used by the computing device 102 to execute an application, access help content, monitor user interactions with the application in response to detection of a user interaction with help content, and create key pairs. The core processing module 200 may be used by the computing device 102 to analyze the key pairs to provide feedback regarding the effectiveness of the help content, as described above and in more detail below. Alternatively, the computing device 102 may store generated key pairs to the correlation database 110 and the server 106 may analyze the key pairs to provide feedback regarding the effectiveness of the help content. As another alternative, the developer computing device 108 may operate to execute an application, access help content, monitor user interactions with the application in response to detection of a user interaction with help content, create key pairs, and analyze the key pairs to provide feedback regarding the effectiveness of the help content. Many variations are possible and all are considered within the scope of the present subject matter. In any such implementation, the features and functionality of the core processing module 200 may be provided to perform the respective processing tasks for the given implementation. As such, for purposes of the present description, each of the computing device 102, the server 106, and the developer computing device 108 may be considered capable of performing automated application documentation effectiveness monitoring and feedback in either a stand-alone or complementary manner.

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. For example, where the server 106 provides feedback to either the computing device 102 and/or the developer computing device 108, the display 204 and/or the input device 206 may be considered optional, as appropriate for a given implementation. Accordingly, the core processing module 200 may operate as a completely automated embedded device with the documentation effectiveness feedback described herein provided via a separate device. However, the core processing module 200 may also provide user feedback and configurability via the display 204 and the input device 206, respectively.

A communication module 208 provides interconnection capabilities that allow the core processing module 200 to communicate with other modules within the system 100. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes a help content storage area 212 that stores documentation and help content for an application, such as an application stored within an application storage area 214. For purposes of the present example, it is assumed that at least part of the application stored within the application storage area 214 may be executed locally within the memory 210 or may be downloaded and executed at least in part remotely from the core processing module 200. For other possible example implementations, there may be no portion of an application stored within the application storage area 214 and that storage area may be omitted for such an implementation. The dashed line that surrounds the help content storage area 212 and the application storage area 214 represents that the help content may form a portion of the application stored within the application storage area 214, as appropriate for a given implementation.

A key pair storage area 216 stores generated key pairs. The generated key pairs may be locally generated where the application within the application storage area 214 executes at least in part on the core processing module 200 or may be received from a different device and stored within the key pair storage area 216 for analysis and feedback. Alternatively and/or additionally, the key pairs may be stored within the correlation database 110 and retrieved for processing within the key pair storage area 216, or vice versa.

A correlation information storage area 218 stores correlation information. The correlation information may include statistical or other analytical processing results of analysis of one or more key pairs to determine effectiveness of application documentation, as described above and in more detail below. This correlation information may be stored to and/or retrieved from the correlation database 110, as appropriate for the respective devices of FIG. 1 with which the core processing module 200 is associated.

Many other variations exist for storage and processing of key pairs and feedback regarding documentation effectiveness. As such, any such variations are considered within the scope of the present subject matter.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A help content processing module 220 is also illustrated. The help content processing module 220 provides application help content monitoring, key pair creation, key pair analysis, and/or feedback of documentation effectiveness for the core processing module 200, as described above and in more detail below and as appropriate for the given implementation. The help content processing module 220 implements the automated application documentation effectiveness monitoring and feedback of the core processing module 200.

Though the help content processing module 220 is illustrated as a component-level module for ease of illustration and description purposes, it should be noted that the help content processing module 220 may include any hardware, programmed processor(s), and memory used to carry out the functions of this module as described above and in more detail below. For example, the help content processing module 220 may include additional controller circuitry in the form of application specific integrated circuits (ASICs), processors, and/or discrete integrated circuits and components for performing communication and electrical control activities associated with the respective devices. Additionally, the help content processing module 220 may include interrupt-level, stack-level, and application-level modules as appropriate. Furthermore, the help content processing module 220 may include any memory components used for storage, execution, and data processing for performing processing activities associated with the module.

It should also be noted that the help content processing module 220 may form a portion of other circuitry described without departure from the scope of the present subject matter. Further, the help content processing module 220 may alternatively be implemented as an application stored within the memory 210. In such an implementation, the help content processing module 220 may include instructions executed by the CPU 202 for performing the functionality described herein. The CPU 202 may execute these instructions to provide the processing capabilities described above and in more detail below for the core processing module 200. The help content processing module 220 may form a portion of an interrupt service routine (ISR), a portion of an operating system, a portion of a browser application, or a portion of a separate application without departure from the scope of the present subject matter.

A timer/clock module 222 is illustrated and used to determine timing and date information, such as a recording period for monitoring of user interactions in response to detected accesses to items of help content, as described above and in more detail below. As such, the core processing module 200 may utilize information derived from the timer/clock module 222 for information processing activities, such as the automated application documentation effectiveness monitoring and feedback described herein.

The correlation database 110 is also shown within FIG. 2 to be associated with the core processing module 200. As such, the correlation database 110 may be locally connected to the core processing module 200 without departure from the scope of the present subject matter.

The CPU 202, the display 204, the input device 206, the communication module 208, the memory 210, the help content processing module 220, the timer/clock module 222, and the correlation database 110 are interconnected via an interconnection 224. The interconnection 224 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the correlation database 110 is shown as a separate component, the correlation database 110 may also be stored within the memory 210 without departure from the scope of the present subject matter. Accordingly, the core processing module 200 may take many forms and may be associated with many platforms.

Figure 3:
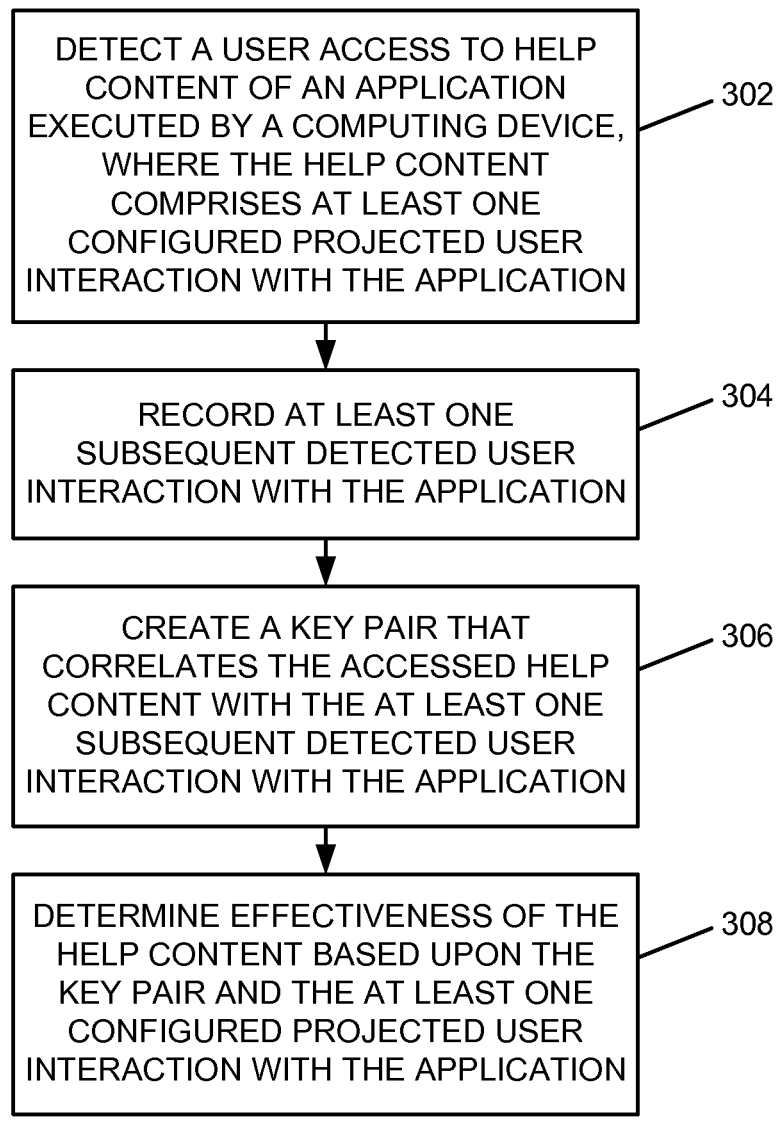
FIG. 3 is a flow chart of an example of an implementation of a process for automated application documentation effectiveness monitoring and feedback according to an embodiment of the present subject matter.
Figure 4:
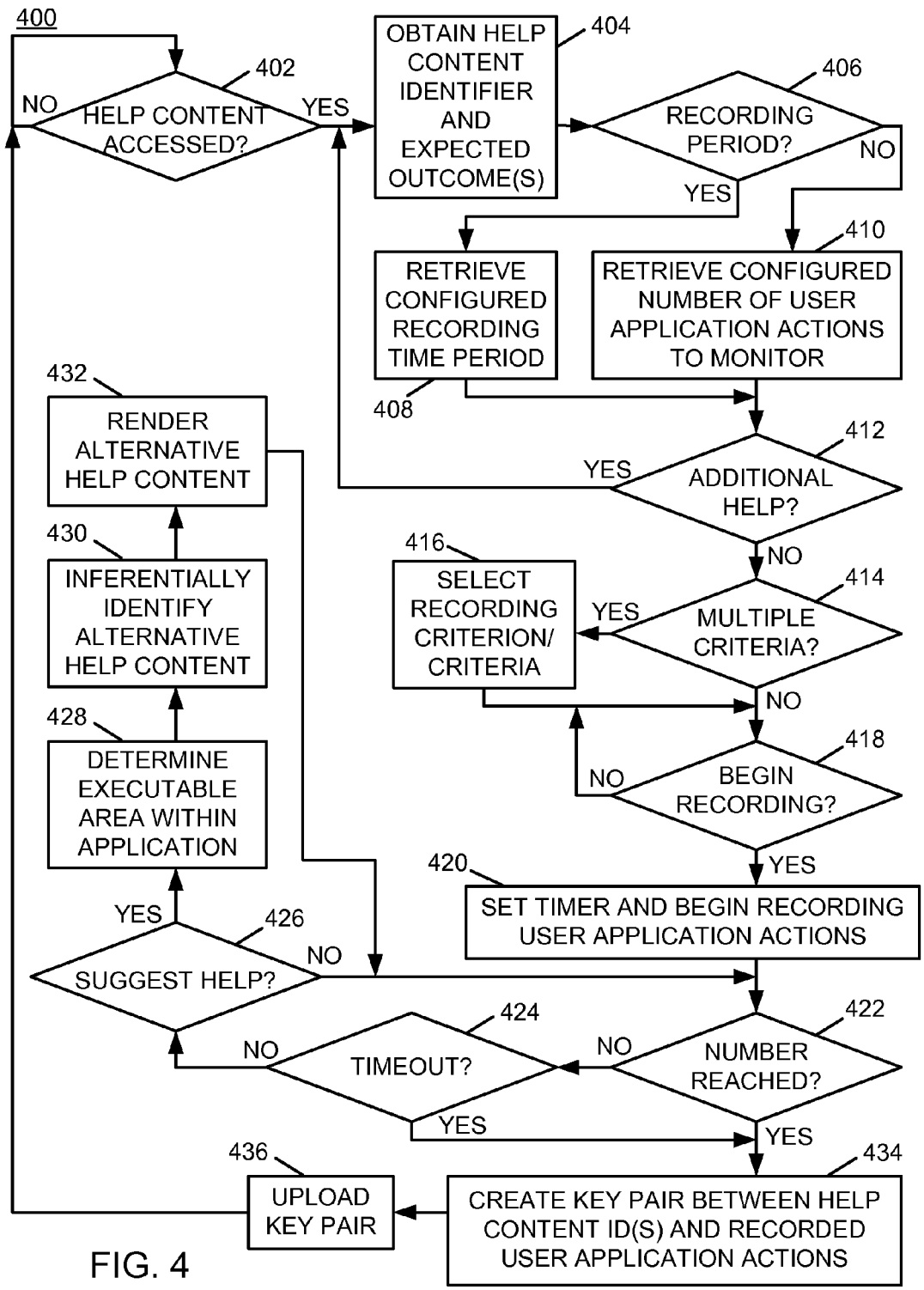
FIG. 4 is a flow chart of an example of an implementation of a process for automated application documentation effectiveness monitoring at a computing device according to an embodiment of the present subject matter.
Figure 5:
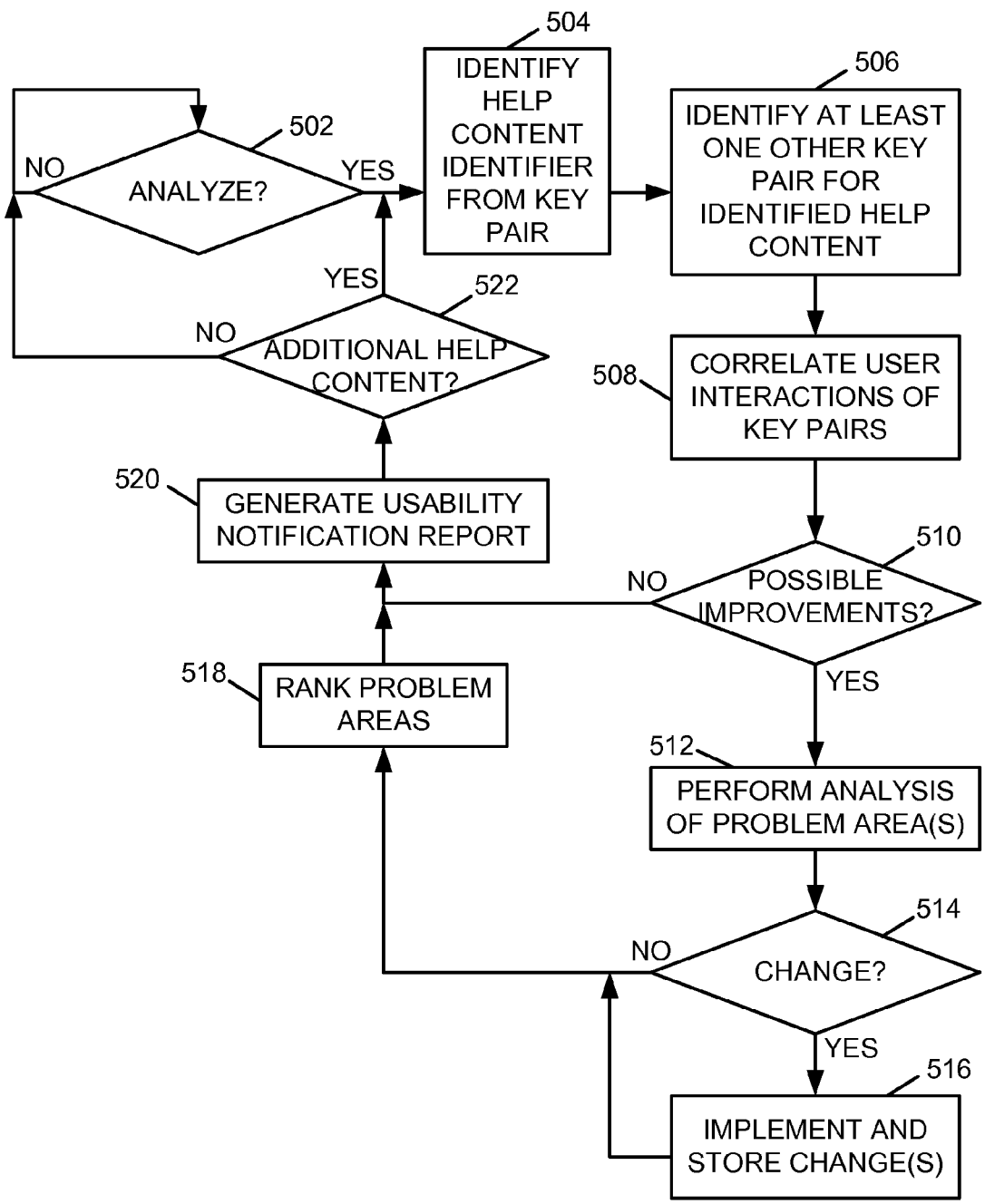
FIG. 5 is a flow chart of an example of an implementation of a process for automated application documentation effectiveness analysis and feedback at a computing device, such as a server or a developer computing device, according to an embodiment of the present subject matter.

FIG. 3 through FIG. 5 below describe example processes that may be executed by devices, such as the core processing module 200, to perform the automated application documentation effectiveness monitoring and feedback associated with the present subject matter. Many other variations on the example processes are possible and all are considered within the scope of the present subject matter. The example processes may be performed by modules, such as the help content processing module 220 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated application documentation effectiveness monitoring and feedback. At block 302, the process 300 detects a user access to help content of an application executed by a computing device, where the help content comprises at least one configured projected user interaction with the application. At block 304, the process 300 records at least one subsequent detected user interaction with the application. At block 306, the process 300 creates a key pair that correlates the accessed help content with the at least one subsequent detected user interaction with the application. At block 308, the process 300 determines effectiveness of the help content based upon the key pair and the at least one configured projected user interaction with the application.

FIG. 4 is a flow chart of an example of an implementation of a process 400 for automated application documentation effectiveness monitoring at a computing device, such as the computing device 102. At decision point 402, the process 400 makes a determination as to whether a help content access has been detected. As discussed above, help content may be integrated into an application. Alternatively, help content may be accessible via an information center or via web access. Selection of a help-monitoring specific hyperlink associated with help content as described above may also trigger a notification of and initiate processing for monitoring help content interactions. Other variations on detecting access to help content are possible and all are considered within the scope of the present subject matter. As such, detection of an access to help content may include any form of access to help content as appropriate for a given implementation.

At block 404, the process 400 obtains a help content identifier and any configured expected outcomes. The expected outcome(s) may be utilized, for example, to suggest alternative and/or additional help content as described in more detail below. The help content identifier may be assigned by a help content developer or otherwise. The help content identifier may be stored, for example, within the help content storage area 212 as metadata separate from the application, may be stored within an application executable, may be stored at a server, may be stored within a local or remote database, or may otherwise be obtained as appropriate for a given implementation.

At decision point 406, the process 400 makes a determination as to whether a recording time period has been configured for the identified help content. As described above, a recording time period may be configured for recording user interactions associated with access to the identified help content. Alternatively, a number of user interactions subsequent to accessing an item of help content and/or return of focus to an application may be configured. As such, the process 400 may determine to record user interactions with the application for a configured recording time period in response to determining that the recording time period has been configured for the accessed help content, or may determine to record the configured number of user interactions with the application in response to determining that the number of user interactions has been configured for the accessed help content. Other possibilities exist for configuring approaches to monitoring user interactions within an application and all are considered within the scope of the present subject matter.

The recording of user interactions associated with an item of help content may be dynamically configured to allow selective analysis of help content effectiveness. Further, recording of user interactions associated with an item of help content may be configured at a chosen granularity of the obtained help content identifiers (e.g., per topic, per application task, etc.).

In response to determining that a recording time period has been configured for the identified item of help content, the process 400 retrieves the configured recording time period at block 408. In response to determining that a number of user interactions subsequent to accessing an item of help content and/or return of focus to an application has been configured, the process 400 retrieves the configured number of user interactions to monitor at block 410.

For purposes of the present example, the configured recording time period and the configured number of user interactions to monitor may be considered recording criteria. As described in more detail below, multiple help content interactions may be detected. Each item of help content may be configured with a different recording criterion. Where multiple help content selections are detected, a single recording criterion may be selected for evaluation of the selected set of help content. Alternatively, multiple configured recording criteria may be selected as appropriate for a given implementation. For example, a configured recording time period may be used as a timeout threshold, while a configured number of user interactions may be used as a user interaction threshold. As such, whichever recording criterion elapses first may be used to identify completion of the configured monitoring of user interactions. It should also be noted that a single item of help content may be configured with both a recording time period and a number of user interactions to monitor without departure from the scope of the present subject matter, and thresholds described above may be processed in a similar manner for a single item of help content.

In response to retrieving the recording time period at block 408 or retrieving the configured number of user interactions to monitor at block 410, the process 400 makes a determination as to whether an additional help content selection has been detected at decision point 412. Such a detected user interaction with help content may suggest a search by a user for a particular item of help content other than the initially-selected item of help content, may suggest a more discriminating review of help content, or may suggest some other user interaction with the help content. As such, multiple sequential accesses to help content may be detected and this information may be omitted from the analysis or included as appropriate for a given implementation.

In response to determining that an additional help content selection has been detected at decision point 412, the process 400 returns to block 404 to obtain a help content identifier for the newly-accessed item of help content, and the process 400 iterates as described above. In response to determining that an additional help content selection has not been detected at decision point 412, the process 400 makes a determination at decision point 414 as to whether multiple configured recording criteria have been identified based upon the previous processing described above. As also described above, multiple help content topic selections may have been detected and/or single items of help content may be configured with multiple recording criteria.

In response to determining that multiple configured recording criteria have been identified at decision point 414 the process 400 selects one or more recording criteria from the set of retrieved configured recording time periods and/or number of user interactions at block 416. As described above, a configured recording time period may be used as a timeout threshold, while a configured number of user interactions may be used as a user interaction threshold. As such, whichever recording criterion elapses first may be used to identify completion of the configured monitoring of user interactions.

In response to determining that multiple configured recording criteria have not been identified at decision point 414, or in response to selecting one or more recording criteria from the set of retrieved configured recording time periods and/or number of user interactions at block 416, the process 400 makes a determination at decision point 418 as to whether to begin recording user interactions. As described above, recording of user interactions may begin in response to detection of a return of focus to an application or in response to other detected interactions (e.g., a loss of focus to help content, or the closing of a help content panel/pane within a user interface, etc.). As such, any appropriate event may be used for the determination at decision point 418.

In response to determining to begin recording user interactions, the process 400 sets a timer, such as the timer/clock module 222 (e.g., if a time-based recording criteria is selected at block 416), and begins recording user application interactions at block 420. At decision point 422, the process 400 enters a loop of processing by making a determination as to whether the configured number of user interactions has been reached. In response to determining that the configured number of user interactions has not been reached, the process 400 makes a determination as to whether the timer for the recording time period has expired at decision point 424. In response to determining that the timer for the recording time period has not expired, the process 400 makes a determination as to whether to suggest additional help content at decision point 426. In response to determining not to suggest additional help content, the process returns to decision point 422 and iterates as described above.

Returning to the description of decision point 426, a determination to suggest additional help content may be based, for example, upon a determination that at least one subsequent user interaction with the application is different from a configured projected user interaction with the application (e.g., an expected outcome).

In response to determining to suggest additional help content at decision point 426, the process 400 determines an executable area within the application at block 428. The determined executable area may be an executable area within the application from which the help content was accessed or an area associated with the subsequent user interaction that is different from the configured projected user interaction with the application. At block 430, the process 400 inferentially identifies at least one item of alternative help content related to the subsequent user interaction with the application determined to be different from at least one configured projected user interaction with the application and the determined executable area within the application. At block 432, the process 400 renders an indication of availability of the additional/alternative help content and renders the additional/alternative help content in response to detection of a user request for the additional/alternative help content. It should be noted that suggestions for additional help content may result in additional/alternative configured recording criteria. As appropriate for a given implementation, the additional/alternative configured recording criteria may replace the selected recording criteria/criterion and processing may be routed back to decision point 418. To reduce complexity within the drawing figure, for purposes of the present example, it is assumed that the original selected recording criterion/criteria remain in effect. Additionally, the timer and/or number of user interactions may also be reset or paused in association with the processing to render alternative help content, as appropriate for a given implementation.

In response to completion of processing associated with rendering alternative help content, the process 400 returns to decision point 422 and iterates as described above. In response to either determining at decision point 422 that the configured number of user interactions has been reached or determining at decision point 424 that the timer for the recording time period has expired, the process 400 creates a key pair between the help content identifiers (IDs) and the recorded user application interactions at block 434. At block 436, the process 400 uploads the key pair for evaluation, such as to the correlation database 110. The process 400 returns to decision point 402 and iterates as described above.

As such, the process 400 monitors for accesses to help content and identifies any accessed help content. The process 400 retrieves and selects recording criteria and records user interactions. The process 400 may also suggest alternative help content. The process 400 creates a key pair between the help content identifiers (IDs) and the recorded user application interactions and uploads the created key pair for evaluation of the effectiveness of the help content. It should be noted that, while the present example describes creation of a single key pair, multiple key pairs may be created based upon the monitored user interactions without departure from the scope of the present subject matter. Additionally, the processing of FIG. 4 may be combined with the processing described in association with FIG. 5 below without departure from the scope of the present subject matter.

FIG. 5 is a flow chart of an example of an implementation of a process 500 for automated application documentation effectiveness analysis and feedback at a computing device, such as the server 106 or the developer computing device 108. However, as noted above, the process 400 of FIG. 4 may be combined with the process 500 and monitoring, analysis, and feedback may be performed at a single device as appropriate for a given implementation. Further, while the present example is directed to processing to correlate multiple key pairs, processing of a single key pair may be performed by use of a subset of the processing described in association with the process 500.

At decision point 502, the process 500 makes a determination as to whether a request to analyze the effectiveness of help content has been detected. A request to analyze the effectiveness of help content may be detected, for example, in response to receipt or retrieval of a key pair, in response to creation of a key pair where the process 400 and process 500 are combined, in response to a developer request for analysis, or in response to other events as appropriate for a given implementation.

In response to determining that a request to analyze the effectiveness of help content has been detected, the process 500 identifies the help content via the key pair at block 504. At block 506, the process 500 identifies at least one other key pair that identifies the same help content. At block 508, the process 500 correlates the subsequent detected user interaction(s) of the key pair and the subsequent detected user interaction(s) of the at least one other key pair. The correlation may include performing mathematical calculations, (e.g., statistical or other), creation of a histogram, pie chart, graph, or other output, to identify trends within the data that are suggestive or determinative of the effectiveness of the help content.

At decision point 510, the process 500 makes a determination as to whether possible improvements or refinements within either the help content or the application interface may be inferred from the correlation of the user interactions of the key pairs. In response to determining that possible improvements within either the help content or the application interface may be inferred from the correlation of the user interactions of the key pairs, the process 500 performs analysis of the problem area(s) of either the help content or the application at block 512. Analysis of help content may include analysis of a number of words or paragraphs within an item of help content, an organization of the help content, or other analysis as appropriate for a given implementation. Further, analysis of an application may include analysis of a number of entry fields/elements in a dialog box, organization of those elements, or other analysis as appropriate for a given implementation.

At decision point 514, the process 500 makes a determination as to whether to change the at least one configured projected user interaction or the help content itself based upon the determined effectiveness of the help content. In response to determining to change any configured projected user interaction(s), the help content itself, or the application itself based upon the determined effectiveness of the help content, the process 500 implements and stores any changes to configured projected user interaction(s), the help content itself, and/or the application itself at block 516. As such, the process 500 may identify at least one improvement to the help content and/or application based upon the correlated subsequent detected user interactions of the key pair and the at least one other key pair, and change the respective element based upon the identified at least one improvement.

It is understood that the processing at block 516 may be considered suggestive and may be subject to review by developers prior to release. Further, changing the help content itself may result in additional or fewer help content identifiers for future effectiveness analysis. Recommended changes to help content, expected user interactions, and/or applications may additionally and/or alternatively be forwarded to developers for approval or implementation, or may be automatically generated if configured for such processing and reviewed by developers for subsequent approval and release. For example, a graphical user interface (GUI) dialog box may be partitioned into multiple dialog boxes or multiple dialog boxes may be combined into a single dialog box in an automated manner if configured and as appropriate for a given implementation, and such changes may be reviewed and approved by developers. As such, automated generation of identified suggested changes may expedite development and release of improvements to help content and/or applications.

In response to determining not to change any configured projected user interaction(s), the help content itself, or the application itself at decision point 514, or in response to completing any changes at block 516, the process 500 ranks the area for improvement (of the help content and/or application) among other determined areas for improvement at block 518. For example, the top "N" usability issues may be identified and ranked. At block 520, the process 500 generates a usability notification report including the identified help content, the determined area for improvement of the help content, the identified improvement(s) to the help content, and the suggested/implemented change to the help content. The usability notification report may further include the ranking of the area for improvement of the help content and/or application, as well as identifiers of any changes to the expected user interactions and/or the application. The usability notification report may be sent via email, instant message, or otherwise communicated to a developer. Further, the usability notification report may highlight actions taken most often by users, key areas of an application for which help was requested, or any other information appropriate for a given implementation.

Upon generating the usability notification report at block 520, the process 500 makes a determination at decision point 522 as to whether a request for analysis of effectiveness of additional help content has been detected. In response to determining that a request for analysis of additional help content has been detected, the process 500 returns to block 504 to identify the help content via the key pair and iterates as described above. In response to determining that a request for analysis of additional help content has not been detected, the process 500 returns to decision point 502 to await a new request for analysis and iterates as described above.

As such, the process 500 evaluates at least one key pair and determines possible improvements. Further, the process 500 may perform mathematical analysis and correlation across key pairs. The process 500 may further automatically implement changes to help content, expected user interactions, and/or applications. The process 500 generates a usability notification report that identifies trends of user interaction and any suggested changes. These changes may be reviewed by developers and implemented or further modified.

As described above in association with FIG. 1 through FIG. 5, the example systems and processes provide automated application documentation effectiveness monitoring and feedback. Many other variations and additional activities associated with automated application documentation effectiveness monitoring and feedback are possible and all are considered within the scope of the present subject matter.

Those skilled in the art will recognize, upon consideration of the above teachings, that certain of the above examples are based upon use of a programmed processor, such as CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    recording, responsive to a detected user access by a user to help content of an application, at least one subsequent detected user interaction with the application that documents the user's actual use of the application in response to instructions within the accessed help content, where the help content further comprises tracking metrics comprising at least one configured expected user interaction with the application to perform the instructions within the accessed help content;
    creating a help-content/application-use key pair that comprises an identifier of the accessed help content and that stores the recorded at least one subsequent detected user interaction with the application after the help content was accessed; and
    determining effectiveness of the instructions within the accessed help content at improving the user's proficiency in using the application by comparison of the recorded at least one subsequent detected user interaction with the application after the help content was accessed stored within the help-content/application-use key pair with the at least one configured expected user interaction with the application to perform the instructions within the accessed help content.

2. The method of claim 1, further comprising determining whether one of a recording time period and a number of user interactions have been configured for the accessed help content and where:
    recording, responsive to the detected user access by the user to the help content of the application, the at least one subsequent detected user interaction with the application that documents the user's actual use of the application in response to the instructions within the accessed help content comprises:
        recording user interactions with the application for the configured recording time period in response to determining that the recording time period has been configured for the accessed help content; and
        recording the configured number of user interactions with the application in response to determining that the number of user interactions has been configured for the accessed help content.

3. The method of claim 1, where determining the effectiveness of the instructions within the accessed help content at improving the user's proficiency in using the application by comparison of the recorded at least one subsequent detected user interaction with the application after the help content was accessed stored within the help-content/application-use key pair with the at least one configured expected user interaction with the application to perform the instructions within the accessed help content comprises:
    identifying the help content via the identifier within the help-content/application-use key pair;
    identifying at least one other help-content/application-use key pair that identifies the same help content;
    correlating the at least one subsequent detected user interaction of the help-content/application-use key pair and the at least one subsequent detected user interaction of the at least one other help-content/application-use key pair; and
    determining whether the correlated subsequent detected user interactions of the help-content/application-use key pair and the at least one other help-content/application-use key pair identify an area for improvement to the help content.

4. The method of claim 3, further comprising:
    identifying at least one improvement to the instructions within the accessed help content based upon the correlated subsequent detected user interactions of the help-content/application-use key pair and the at least one other help-content/application-use key pair; and
    changing the instructions within the accessed help content based upon the identified at least one improvement to the help content.

5. The method of claim 4, further comprising generating a usability notification report comprising the identified help content, the identified area for improvement to the help content, the identified at least one improvement to the instructions within the accessed help content, and the change to the instructions within the accessed help content.

6. The method of claim 5, further comprising ranking the area for improvement to the help content among other identified areas for improvement to the help content and where generating the usability notification report comprises generating the usability notification report comprising the ranking of the area for improvement to the help content.

7. The method of claim 1, further comprising:
determining to change the at least one configured expected user interaction based upon the determined effectiveness of the instructions within the accessed help content; and
changing the at least one configured expected user interaction.

8. The method of claim 1, further comprising:
determining that the recorded at least one subsequent user interaction with the application is different from the at least one configured expected user interaction with the application;
determining an executable area within the application from which the help content was accessed;
inferentially identifying at least one item of alternative help content related to the recorded at least one subsequent user interaction with the application determined to be different from the at least one configured expected user interaction with the application and the determined executable area within the application from which the help content was accessed; and
rendering an indication of availability of the at least one item of alternative help content.

9. A system, comprising:
a memory; and
a processor programmed to:
record to the memory, responsive to a detected user access by a user to the help content of an application, at least one subsequent detected user interaction with the application that documents the user's actual use of the application in response to instructions within the accessed help content, where the help content further comprises tracking metrics comprising at least one configured expected user interaction with the application to perform the instructions within the accessed help content;
create a help-content/application-use key pair that comprises an identifier of the accessed help content and that stores the recorded at least one subsequent detected user interaction with the application after the help content was accessed; and
determine effectiveness of the instructions within the accessed help content at improving the user's proficiency in using the application by comparison of the recorded at least one subsequent detected user interaction with the application after the help content was accessed stored within the help-content/application-use key pair with the at least one configured expected user interaction with the application to perform the instructions within the accessed help content.

10. The system of claim 9, where the processor is further programmed to determine whether one of a recording time period and a number of user interactions have been configured for the accessed help content and where:
in being programmed to record, responsive to the detected user access by the user to the help content of the application, the at least one subsequent detected user interaction with the application that documents the user's actual use of the application in response to the instructions within the accessed help content, the processor is programmed to:
record user interactions with the application for the configured recording time period in response to determining that the recording time period has been configured for the accessed help content; and
record the configured number of user interactions with the application in response to determining that the number of user interactions has been configured for the accessed help content.

11. The system of claim 9, where, in being programmed to determine the effectiveness of the instructions within the accessed help content at improving the user's proficiency in using the application by comparison of the recorded at least one subsequent detected user interaction with the application after the help content was accessed stored within the help-content/application-use key pair with the at least one configured expected user interaction with the application to perform the instructions within the accessed help content, the processor is programmed to:
identify the help content via the identifier within the help-content/application-use key pair;
identify at least one other help-content/application-use key pair that identifies the same help content;
correlate the at least one subsequent detected user interaction of the help-content/application-use key pair and the at least one subsequent detected user interaction of the at least one other help-content/application-use key pair; and
determine whether the correlated subsequent detected user interactions of the help-content/application-use key pair and the at least one other help-content/application-use key pair identify an area for improvement to the help content.

12. The system of claim 11, where the processor is further programmed to:
identify at least one improvement to the instructions within the accessed help content based upon the correlated subsequent detected user interactions of the help-content/application-use key pair and the at least one other help-content/application-use key pair; and
change the instructions within the accessed help content based upon the identified at least one improvement to the help content.

13. The system of claim 12, where the processor is further programmed to generate a usability notification report comprising the identified help content, the identified area for improvement to the help content, the identified at least one improvement to the instructions within the accessed help content, and the change to the instructions within the accessed help content.

14. The system of claim 13, where the processor is further programmed to rank the area for improvement to the help content among other identified areas for improvement to the help content and where, in being programmed to generate the usability notification report, the processor is programmed to generate the usability notification report comprising the ranking of the area for improvement to the help content.

15. The system of claim 9, where the processor is further programmed to:
determine to change the at least one configured expected user interaction based upon the determined effectiveness of the instructions within the accessed help content; and change the at least one configured expected user interaction.

16. The system of claim 9, further comprising:
a display; and
where the processor is further programmed to:
determine that the recorded at least one subsequent user interaction with the application is different from the at least one configured expected user interaction with the application;
determine an executable area within the application from which the help content was accessed;
inferentially identify at least one item of alternative help content related to the recorded at least one subsequent user interaction with the application determined to be different from the at least one configured expected user interaction with the application and the determined executable area within the application from which the help content was accessed; and
render an indication of availability of the at least one item of alternative help content on the display.

17. A computer program product comprising a computer readable storage memory including computer readable program code, where the computer readable program code when executed on a computer causes the computer to:
record, responsive to a detected user access by a user to help content of an application, at least one subsequent detected user interaction with the application that documents the user's actual use of the application in response to instructions within the accessed help content, where the help content further comprises tracking metrics comprising at least one configured expected user interaction with the application to perform the instructions within the accessed help content;
create a help-content/application-use key pair that comprises an identifier of the accessed help content and that stores the recorded at least one subsequent detected user interaction with the application after the help content was accessed; and
determine effectiveness of the instructions within the accessed help content at improving the user's proficiency in using the application by comparison of the recorded at least one subsequent detected user interaction with the application after the help content was accessed stored within the help-content/application-use key pair with the at least one configured expected user interaction with the application to perform the instructions within the accessed help content.

18. The computer program product of claim 17, where the computer readable program code when executed on the computer further causes the computer to determine whether one of a recording time period and a number of user interactions have been configured for the accessed help content and where:
in causing the computer to record, responsive to the detected user access by the user to the help content of the application, the at least one subsequent detected user interaction with the application that documents the user's actual use of the application in response to the instructions within the accessed help content, the computer readable program code when executed on the computer causes the computer to:
record user interactions with the application for the configured recording time period in response to determining that the recording time period has been configured for the accessed help content; and
record the configured number of user interactions with the application in response to determining that the number of user interactions has been configured for the accessed help content.

19. The computer program product of claim 17, where, in causing the computer to determine the effectiveness of the instructions within the accessed help content at improving the user's proficiency in using the application by comparison of the recorded at least one subsequent detected user interaction with the application after the help content was accessed stored within the help-content/application-use key pair with the at least one configured expected user interaction with the application to perform the instructions within the accessed help content, the computer readable program code when executed on the computer causes the computer to:
identify the help content via the identifier within the help-content/application-use key pair;
identify at least one other help-content/application-use key pair that identifies the same help content;
correlate the at least one subsequent detected user interaction of the help-content/application-use key pair and the at least one subsequent detected user interaction of the at least one other help-content/application-use key pair; and
determine whether the correlated subsequent detected user interactions of the help-content/application-use key pair and the at least one other help-content/application-use key pair identify an area for improvement to the help content.

20. The computer program product of claim 19, where the computer readable program code when executed on the computer further causes the computer to:
identify at least one improvement to the instructions within the accessed help content based upon the correlated subsequent detected user interactions of the help-content/application-use key pair and the at least one other help-content/application-use key pair; and
change the instructions within the accessed help content based upon the identified at least one improvement to the help content.

21. The computer program product of claim 20, where the computer readable program code when executed on the computer further causes the computer to generate a usability notification report comprising the identified help content, the identified area for improvement to the help content, the identified at least one improvement to the instructions within the accessed help content, and the change to the instructions within the accessed help content.

22. The computer program product of claim 21, where the computer readable program code when executed on the computer further causes the computer to rank the area for improvement to the help content among other identified areas for improvement to the help content and where, in causing the computer to generate the usability notification report, the computer readable program code when executed on the computer causes the computer to generate the usability notification report comprising the ranking of the area for improvement to the help content.

23. The computer program product of claim 17, where the computer readable program code when executed on the computer further causes the computer to:
determine to change the at least one configured expected user interaction based upon the determined effectiveness of the instructions within the accessed help content; and
change the at least one configured expected user interaction.

24. The computer program product of claim 17, where the computer readable program code when executed on the computer further causes the computer to:
- determine that the recorded at least one subsequent user interaction with the application is different from the at least one configured expected user interaction with the application;
- determine an executable area within the application from which the help content was accessed;
- inferentially identify at least one item of alternative help content related to the recorded at least one subsequent user interaction with the application determined to be different from the at least one configured expected user interaction with the application and the determined executable area within the application from which the help content was accessed; and
- render an indication of availability of the at least one item of alternative help content.

\* \* \* \* \*